Patented Apr. 30, 1946

2,399,558

UNITED STATES PATENT OFFICE 2,399,558

ORGANIC CEMENTING SOLUTIONS

Edward H. McArdle, Linden, and Anthony E. Robertson, Roselle, N. J., assignors to Standard Oil Development Company, a corporation of Delaware No Drawing. Application December 31, 1942, Serial No. 470,826

3 Claims. (Cl. 260—32)

The present invention pertains to certain novel compositions of matter. More particularly this invention pertains to solutions of resinous materials or natural and/or synthetic rubber-like materials.

Rubber or rubbery organic materials as well as certain resinous materials have heretofore been dissolved in straight chain paraffins to provide solutions of the necessary characteristics of flow, set-up and tack time to serve as cements for adhering to wide variety of materials together.

It is the object of the present invention to provide the art with certain new solutions of elastomers or rubbery organic materials as well as resinous materials which are capable of use as adhesives.

It is a further object of the present invention to provide the art with solutions of rubbery or resinous organic materials having the desired characteristics of flow, set-up and tack time to serve as cements but which contain a lower percentage of rubbery or resinous organic materials than known cements.

These and other objects will appear more clearly from the detailed description and claims which follow.

It has been found that cement stocks having the desired characteristics of flow, set-up and tack time but which contain a smaller concentration of resinous or rubbery organic materials, are obtained if said materials are dissolved in branched chain paraffins rather than in normal paraffins. It has been found that with the same concentration of rubbery or resinous organic materials it is possible substantially to double the absolute viscosity by utilizing branched chain paraffins instead of normal paraffins of the same molecular weight or of the same boiling range. Alternatively, we have found that cements of the same viscosity characteristics but which contain a much lower concentration of resinous or rubbery material may be prepared when branched chain paraffins are utilized as the solvent.

The branched chain paraffins which may be used as solvents for the cements in accordance with the present invention contain from 5 to 9 carbon atoms in the molecule. As to the degree of branching, it is noted that the preferred compounds tend to be highly branched. Specific branched chain paraffins which may be used include isopentane, neohexane or 2,2-dimethyl butane, 2,3-dimethyl butane, 2-methyl pentane, 3-methyl pentane, triptane or 2,2,3-trimethyl-butane and other branched $C_7$ paraffins, and isooctane or 2,2,4-trimethyl pentane, 3-ethyl hexane and other branched $C_8$ paraffins, 2,4-dimethyl heptane and other branched $C_9$ paraffins.

The branched chain paraffins that are used as solvents in accordance with the present invention may be prepared in various ways, as by alkylation, catalytic cracking, polymerization, e. g., to isooctene followed by hydrogenation or by isomerization. It is noted, for example, that relatively recent efforts toward the development of high octane gasoline have resulted in the production of a number of stocks which contain large proportions of branched paraffins. The solvents do not have to consist of branched chain paraffins exclusively inasmuch as mixtures containing more than 50% of branched chain paraffins will produce a substantially high viscosity than is obtainable with straight chain paraffins of the same molecular weight. Such mixtures may contain minor proportions of aromatic, naphthenic and straight chain paraffinic hydrocarbons, as well as mixtures of different branched chain hydrocarbons of 5 to 9 carbon atoms per molecule.

The resinous or rubbery organic materials which may be used in the cements in accordance with this invention include natural rubber, synthetic rubber-like materials such as are obtainable by the polymerization in aqueous emulsion of diolefin hydrocarbons such as butadiene, isoprene, piperylene and the like alone or in admixture with copolymerizable compounds such as styrenes. Other polymeric products include high molecular isoolefin polymers such as polyisobutylenes and isoolefin-diolefin copolymers that are obtainable by polymerization of these materials at temperatures below $-10°$ C., preferably at around $-100°$ C. using a Friedel-Crafts type catalyst. Substances of a more resinous nature that may be used include paraffin-hydrocarbon-soluble polystyrenes, modified phenol-formaldehyde condensation products, alkyd resins and drying-oil-modified alkyd resins.

The following examples are illustrative of the present invention but it is to be understood that this invention is by no means limited thereto.

Example 1

A cement stock was prepared by dissolving a milled pale crepe natural rubber in normal hexane and in neohexane (2,2-dimethylbutane) in a concentration of 200 g./liter. The viscosities of the respective solutions at 25° C. were then determined, and the results were as follows:

| | Poises |
|---|---|
| n-Hexane solution | 30.7 |
| Neohexane solution | 43.8 |

Cement stocks of the same concentration of milled pale crepe natural rubber were also prepared using n-heptane and triptane (2,2,3-trimethylbutane) as the solvents and gave the following viscosities at 25° C.

| | Poises |
|---|---|
| n-Heptane | 35.3 |
| Triptane | 66.9 |

Example 2

A cement stock was prepared by dissolving milled Butyl rubber (a copolymer of an isoolefin and a diolefin obtained by polymerizing such mixtures at temperatures below −10° C., and preferably at around −90° C. by the addition of a solution of a Friedel-Crafts type catalyst in a low freezing solvent such as methyl chloride) in normal hexane and in neohexane (2,2-dimethylbutane) in a concentration of 200 g./liter. The viscosities of the respective solutions at 25° C. were as follows:

|  | Poises |
|---|---|
| n-Hexane | 21.8 |
| Neohexane | 42.3 |

Cement stocks of the same concentration of milled Butyl rubber were also prepared using n-heptane and triptane as the solvents and gave the following viscosities at 25° C.

|  | Poises |
|---|---|
| n-Heptane | 30.1 |
| Triptane | 69.1 |

Example 3

A cement stock was prepared by dissolving milled Buna S (a copolymer obtained by polymerization of butadiene and styrene in the ratio of about 3 to 1 in aqueous emulsion using an oxygen liberating polymerization catalyst) in n-heptane and triptane in a concentration of 133 g./liter. The viscosities of the respective solutions at 25° C. were as follows:

|  | Poises |
|---|---|
| n-Heptane | 25.6 |
| Triptane | 50.6 |

The cement stocks in accordance with the present invention may be prepared in a variety of concentrations depending upon the apparent mol weight of the solute used and the particular viscosity of the cement desired for a given application. Since resinous materials generally have lower molecular weights than rubbery materials, they are used in greater amounts than the rubbery materials, and may even be used in amounts as high as 1200 grams per liter. On the other hand, certain higher molecular weight polymers, such as polybutenes of above 100,000 molecular weight, may be used in amounts as low as about 20 grams per liter.

The foregoing description contains a few illustrative examples, but it will be understood that this invention is not limited thereto and that numerous variations are possible without departing from the purview of this invention as defined in the following claims.

What we claim and desire to secure by Letters Patent is:

1. A composition of matter comprising an organic polymeric adhesive material soluble in light hydrocarbon solvents and selected from the group consisting of natural and synthetic hydrocarbon base rubbers, dissolved in a solvent comprising a major proportion of a branched chain paraffin containing from 5 to 9 carbon atoms.

2. A composition of matter comprising an organic polymer adhesive material soluble in light hydrocarbon solvents and selected from the group consisting of natural and synthetic hydrocarbon base rubbers, dissolved in a solvent comprising a major proportion of neohexane.

3. A composition of matter comprising an organic polymeric adhesive material soluble in light hydrocarbon solvents and selected from the group consisting of natural and synthetic hydrocarbon base rubbers, dissolved in a solvent comprising a major proportion of triptane.

EDWARD H. McARDLE.
ANTHONY E. ROBERTSON.